(No Model.)
W. W. KING & F. M. DUNN.
WHEEL HUB.
No. 514,624.  Patented Feb. 13, 1894.
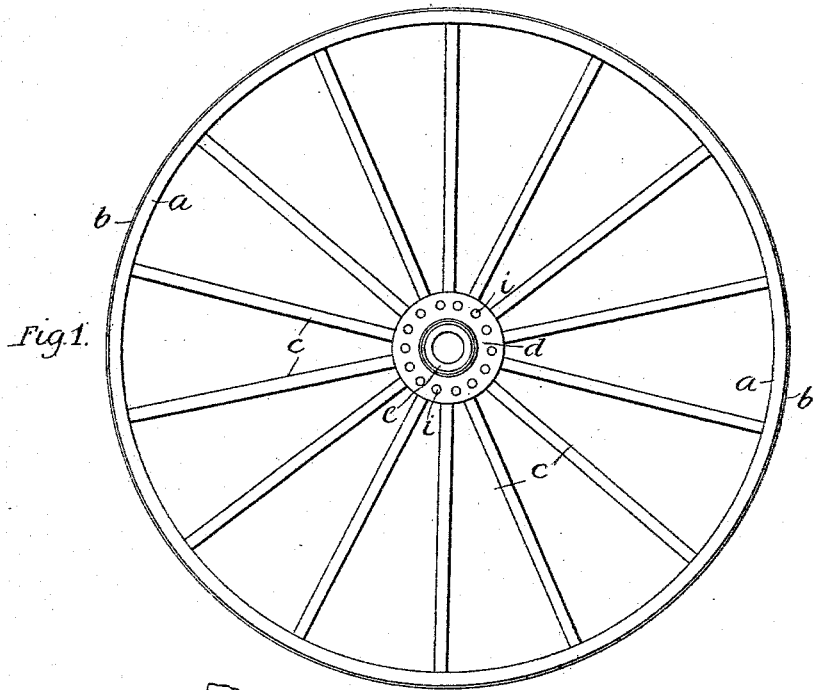
Fig. 1.
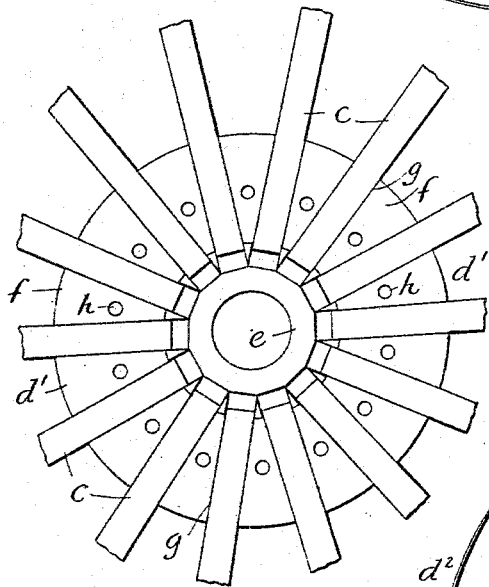
Fig. 2.
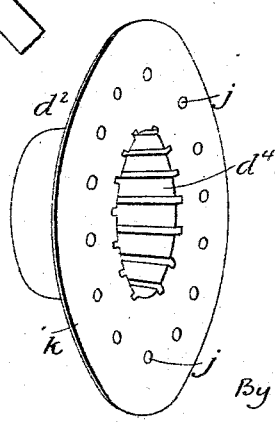
Fig. 4.
Fig. 3.
Witnesses
Inventors
William W. King
Francis M. Dunn
By their Attorneys

UNITED STATES PATENT OFFICE.

WILLIAM WILEY KING AND FRANCIS MARION DUNN, OF WELLMAN, MISSISSIPPI.

WHEEL-HUB.

SPECIFICATION forming part of Letters Patent No. 514,624, dated February 13, 1894.

Application filed May 8, 1893. Serial No. 473,358. (No model.)

*To all whom it may concern:*

Be it known that we, WILLIAM WILEY KING and FRANCIS MARION DUNN, citizens of the United States, residing at Wellman, in the county of Lincoln and State of Mississippi, have invented certain new and useful Improvements in Wheels; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to new and useful improvements in wheels designed for carriages, wagons and the like and has for its object the production of a wheel of comparatively simple construction, by which the several parts may be assembled with a minimum of time and labor, and by which the tire may be put on while cold or without the necessity of previously heating the same.

Our invention is directed more especially to the construction of the new and novel hub employed, which consists essentially of two parts or sections which are brought together and firmly bolted after the insertion of the spokes.

Our invention also consists in the construction of the several parts and their relative arrangement and operation, all of which we will now describe in connection with the accompanying drawings, which form a part of this specification and in which—

Figure 1 illustrates in elevation a wheel embodying our improvements; Fig. 2 an enlarged view of the hub with a portion thereof removed; Fig. 3 a vertical central section, and Fig. 4 a perspective view of the flanged cap detached.

The reference letter $a$ denotes the rim of the wheel, $b$, the tire and $c\ c$ the spokes, the parts being of ordinary construction. The hub $d$ is formed in two parts or sections, one of which $d'$ constitutes the main portion, and the other part $d^2$ serving as a cap which is secured in place after the insertion of the spokes in the part $d'$ and forms with the latter part, the complete hub.

$e$ represents the axle box the inner end of which is slightly tapered and fits within the opening $d^3$ formed in the part $d'$ said opening being also slightly tapered to conform to the shape of the box to prevent endwise thrust. The outer end of the box projects beyond the part $d'$ and when the hub is completed, into the opening $d^4$ of the cap. The part $d'$ is provided at its inner end with a peripheral flange $f$ in which is arranged a series of radial spoke sockets $g\ g$ which extend entirely through said flange and are normally open to receive the spokes sidewise, and closed by the cap after the insertion of said spokes. Between the sockets $g$ are perforations $h$ which receive a series of bolts $i$ which is passed through said perforations and through perforations $j$ formed in the peripheral flange $k$ of the cap $d^2$, nuts $i'$ being employed for the screw-threaded ends of the bolts, which latter are headed and are square ended to prevent turning.

The outer end of the axle box is provided with a series of depressions $e'$ which terminate at points coincident with the inner walls of the spoke sockets, in shoulders $e^2$. By these depressions is formed a series of lengthwise ribs which are engaged by a series of grooves or corrugations formed in the sides of the opening of the cap and these ribs being tapered as are also the grooves, the axle box is securely held against displacement in both directions when the cap is in position. The inner ends of the spokes also by engagement with the shoulders $e^2$ assist to prevent endwise play.

In practice the wheel is built up with the usual operations reversed or in other words, the rim is first placed in the tire, the spokes are driven in, and the skeleton wheel is then placed in position with the inner ends of the spokes adjacent to the sockets in the hub. The spokes are driven in sidewise and when entirely within the sockets, the cap is applied and bolted in place, and the wheel is complete. The wheel when so made is very strong and rigid, and by reason of the hub employed, the parts usually affected by water and other causes, are effectually protected against same. As before stated, the tire may be put on without heating, inasmuch as the usual operations are reversed, and thus both time and labor are saved. In the event of the breakage of one or more spokes, they may be easily replaced without taking the wheel apart, as the operation merely necessitates the removal of the cap and the spokes to be replaced; the insertion of the new spokes, and the application of the cap.

The construction is applicable to wheels of all classes of vehicles, from wheelbarrows to the heaviest drays, as they may be made heavy or light as conditions require.

We claim—

A wheel comprising an axle box having tapering ends, the outer one of which is provided with a series of depressions forming tapering ribs and terminating in shoulders $e^2$, a hub surrounding said box formed in two parts, the inner one of which having a peripheral flange with radial spoke sockets in alignment with the depressions in the box, and the other part having a peripheral flange and a series of grooves in its central opening for the ribs, the spokes having their inner ends in engagement with the shoulders, bolts and nuts for connecting the flanges, and the rim and tire, all substantially as described.

In testimony whereof we affix our signatures in presence of two witnesses.

WILLIAM WILEY KING.
FRANCIS MARION DUNN.

Witnesses:
A. M. McMILLAN,
WESLEY HAYNES.